United States Patent
Jung et al.

(10) Patent No.: US 7,901,102 B2
(45) Date of Patent: Mar. 8, 2011

(54) BACKLIGHT UNIT AND LIQUID CRYSTAL DISPLAY APPARATUS EMPLOYING THE SAME

(75) Inventors: Il-yong Jung, Suwon-si (KR); Ju-seong Hwang, Cheonan-si (KR); Joon-chan Park, Anyang-si (KR); Ji-whan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 11/244,070

(22) Filed: Oct. 6, 2005

(65) Prior Publication Data

US 2006/0087827 A1    Apr. 27, 2006

(30) Foreign Application Priority Data

Oct. 22, 2004   (KR) .................. 10-2004-0084960
Nov. 29, 2004   (KR) .................. 10-2004-0098697

(51) Int. Cl.
 G09F 13/04   (2006.01)
 F21V 21/00   (2006.01)
 G02F 1/1335  (2006.01)

(52) U.S. Cl. .................. 362/97.3; 362/97.1; 362/249.06; 349/61

(58) Field of Classification Search .............. 362/611, 362/612, 613, 555, 646, 227, 240, 249, 265, 362/800, 29, 235, 236, 237, 241, 245, 327, 362/26, 27, 30, 604, 614, 33, 97, 345, 812, 362/260, 23, 225, 329, 622, 626, 628, 243, 362/250, 252; 349/59, 61, 68, 69, 70, 64; 345/32

See application file for complete search history.

(56) References Cited

U.S. PATENT DOCUMENTS

| | | | | |
|---|---|---|---|---|
| 5,577,831 A | * | 11/1996 | Chang | 362/240 |
| 5,777,857 A | * | 7/1998 | Degelmann | 362/150 |
| 6,007,209 A | * | 12/1999 | Pelka | 362/30 |
| 6,386,720 B1 | * | 5/2002 | Mochizuki | 362/27 |
| 6,598,998 B2 | | 7/2003 | West et al. | |
| 6,755,546 B2 | * | 6/2004 | Ohkawa | 362/626 |
| 6,923,548 B2 | * | 8/2005 | Lim | 362/612 |
| 7,052,152 B2 | * | 5/2006 | Harbers et al. | 362/30 |
| 7,159,999 B2 | * | 1/2007 | Yoo et al. | 362/249 |

(Continued)

FOREIGN PATENT DOCUMENTS

JP          4-61302         2/1992

(Continued)

OTHER PUBLICATIONS

Full Certified English translation of "Back light of liquid crystal display device" by Jung-Jai Kim (KR 1997-0013073).*

(Continued)

*Primary Examiner* — Jong-Suk (James) Lee
*Assistant Examiner* — David R Crowe
(74) *Attorney, Agent, or Firm* — Stanzione & Kim, LLP

(57) ABSTRACT

A backlight unit including a plurality of light-emitting device units with varying arrangement intervals such that the light-emitting device units are more densely arranged at edges of a base plate than at center thereof, and a liquid crystal display (LCD) apparatus employing the same. The backlight unit is designed to prevent creation of dark portions on corners due to a shortage in an amount of light, thereby providing improved brightness uniformity.

35 Claims, 8 Drawing Sheets

U.S. PATENT DOCUMENTS

| | | | |
|---|---|---|---|
| 7,220,039 B2 * | 5/2007 | Ahn et al. | 362/612 |
| 2003/0169384 A1 * | 9/2003 | Ohkawa | 349/65 |
| 2003/0235050 A1 * | 12/2003 | West et al. | 362/327 |
| 2004/0228107 A1 * | 11/2004 | Lee et al. | 362/31 |
| 2005/0001537 A1 * | 1/2005 | West et al. | 313/500 |

FOREIGN PATENT DOCUMENTS

| | | |
|---|---|---|
| JP | 5-55103 | 7/1993 |
| JP | 6-230378 | 8/1994 |
| KR | 1996-42145 | 12/1996 |
| KR | 1998-76384 | 11/1998 |
| KR | 98076384 A * | 11/1998 |
| KR | 2002-51366 | 6/2002 |
| KR | 2003-18789 | 3/2003 |
| KR | 10-0421900 | 2/2004 |

OTHER PUBLICATIONS

Korea Office Action dated Jul. 26, 2006 issued in KR 2004-98697.
Chinese Office Action dated Jul. 6, 2007 issued in CN 200510109401.1.

* cited by examiner $A_{CONVENTIONAL}$        $A_{CONVENTIONAL}$ $B_{PRESENT\ INVENTION}$        $B_{PRESENT\ INVENTION}$

BACKLIGHT UNIT AND LIQUID CRYSTAL DISPLAY APPARATUS EMPLOYING THE SAME

CROSS-REFERENCE TO RELATED APPLICATIONS

This application claims the benefit under 35 U.S.C. §119 of Korean Patent Application Nos. 10-2004-84960, filed on Oct. 22, 2004 and 10-2004-98697, filed on Nov. 29, 2004, in the Korean Intellectual Property Office, the disclosures of which are incorporated herein in their entirety by reference.

BACKGROUND OF THE INVENTION

1. Field of the Invention

The present general inventive concept relates to a backlight unit and a liquid crystal display (LCD) apparatus employing the same, and more particularly, to a direct light type backlight unit and an LCD apparatus employing the same.

2. Description of the Related Art

An LCD is one type of non-emissive flat panel display and needs an external light source to produce an image since the LCD itself does not emit light. Accordingly, a backlight unit is located behind the LCD and emits light.

Backlight units are classified into direct light type backlight units and edge light type backlight units according to a position in which light sources of the backlight units are arranged. For a direct light type backlight unit, a plurality of light sources disposed beneath the LCD emit light onto an LCD panel. For an edge light type backlight unit, a light source located along a sidewall of a light guide panel (LGP) emits light onto the LCD panel via the LGP.

The direct light type backlight unit may use light emitting diodes (LEDs) that emit Lambertian radiation as a point light source.

FIG. 1 illustrates a typical arrangement of LEDs 5 for a conventional direct light type backlight unit using the LEDs 5 as point light sources. Referring to FIG. 1, the LEDs 5 are arranged in a two-dimensional array on a printed circuit board (PCB) substrate 1 at equal intervals p. When the conventional backlight unit is measured and observed from a front thereof, four corners of the backlight unit appear dark due to a shortage of light on the four corners.

SUMMARY OF THE INVENTION

The present general inventive concept provides a backlight unit to improve brightness uniformity by improving an arrangement of light-emitting device units in order to prevent corners thereof from appearing dark due to a shortage in an amount of light on the corners, and a liquid crystal display (LCD) apparatus employing the backlight unit.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a backlight unit including a base plate and a plurality of light-emitting device units arranged on the base plate with varying arrangement intervals such that the light-emitting device units are more densely arranged at edges of the base plate than at a center of the base plate.

The plurality of light-emitting device units may be arranged on the base plate in n lines and the light-emitting device units may be more densely arranged at edges of at least one outermost line than at a center thereof. The arrangement intervals between the light-emitting device units arranged in the at least one outermost line may increase from the edges of the at least one outermost line to the center thereof. The same number of light-emitting device units may be arranged on each of the n lines. The light-emitting device units in each of the remaining lines may be arranged at equal arrangement intervals.

When an interval between the light-emitting device units arranged in each of the remaining lines is $d0$, a minimum interval between the light-emitting device units arranged on the edges of the at least one outermost line is $d1$, and a maximum interval between the light-emitting device units arranged on the center thereof is $d2$, the light-emitting device units may be arranged to satisfy $d1<d0<d2$.

The plurality of light-emitting device units may be arranged on the base plate in n lines and a number of light-emitting device units arranged in the at least one outermost line may be greater than a number of light-emitting device units arranged in each of the remaining lines.

The light-emitting device units in each of the remaining lines may be arranged at equal arrangement intervals. The arrangement intervals between the light-emitting device units arranged in the at least one outermost line may increase from the edges of the at least outermost line to the center thereof.

The plurality of light-emitting device units may be arranged on the base plate in n lines and arrangement intervals between outer lines along an arrangement direction of the n lines may be narrower than arrangement intervals between intermediate lines. The same number of light-emitting device units may be arranged on each of the n lines.

Each light-emitting device unit may include a light-emitting diode (LED) chip to generate light, and a collimator to collimate the light generated by the LED chip. The collimator may be a side emitter to emit incident light in an approximately lateral direction. The collimator may be dome-shaped.

The backlight unit may further include an optical plate and a plurality of reflecting mirrors that are disposed on a surface of the optical plate to reflect light emitted directly upward from the light-emitting device units. The optical plate may be made of transparent polymethyl methacrylate (PMMA) or be a transmissive diffusion plate.

The light-emitting device units may emit red, green, and blue color beams, and may be alternately arranged on each line according to color.

The backlight unit may further include a first transmissive diffusion plate that is disposed above the light-emitting device units and transmits and diffuses incident light. The backlight unit may further include a reflective diffusion plate that is disposed below the light-emitting device units and reflects and diffuses incident light.

The backlight unit may further include at least one of a brightness enhancement film (BEF) to improve directionality of light escaping from the first transmissive diffusion plate and a polarization enhancement film to increase an efficiency of polarization.

The foregoing and/or other aspects of the present general inventive concept may also be achieved by providing an LCD apparatus including a liquid crystal panel, and a backlight unit to emit light beams on the liquid crystal panel and having a base plate, and a plurality of light-emitting device units arranged on the base plate with varying arrangement intervals such that the light-emitting device units are more densely arranged at edges of the base plate than at a center of the base plate.

The foregoing and/or other aspects of the present general inventive concept may also be achieved by providing a backlight unit usable with a liquid crystal display (LCD) apparatus, including a base plate, and a plurality of rows of light emitting units disposed on the base plate to emit light, the plurality of rows including outer rows disposed at opposite ends of the base plate and having light emitting units spaced apart by smaller intervals at edges thereof than at a center thereof, and inner rows disposed between the outer rows on the based plate and having light emitting units spaced apart by equal intervals over edges thereof and a center thereof.

The foregoing and/or other aspects of the present general inventive concept may also be achieved by providing a backlight unit usable with a liquid crystal display (LCD) apparatus, including a base plate, and a plurality of rows of light emitting units disposed on the base plate to emit light and arranged such that outer rows of light emitting units are spaced apart by smaller intervals than inner rows of light emitting units.

The foregoing and/or other aspects of the present general inventive concept may also be achieved by providing a backlight unit usable with a liquid crystal display (LCD) apparatus, including a base plate, and light emitting units arranged on the base plate to be separated by different sized intervals in at least one of a lengthwise direction of the base plate and widthwise direction of the base plate according to a location of each light emitting units on the base plate.

The foregoing and/or other aspects of the present general inventive concept may also be achieved by providing a liquid crystal display apparatus including a liquid crystal panel, and a backlight unit to emit light toward the liquid crystal panel, and having a base plate, a first number of light-emitting device units disposed in a first unit area of the base plate, and a second number of light-emitting device units disposed in a second unit area of the base plate having the same size as the first unit area.

The foregoing and/or other aspects of the present general inventive concept may also be achieved by providing a liquid crystal display apparatus including a liquid crystal panel, and a backlight unit to emit light toward the liquid crystal panel, and having a base plate, a first unit having first light-emitting device units disposed in a first area of the base plate to emit the light having a first brightness, and a second unit having second light-emitting device units disposed in a second area of the base plate to emit the light having a second brightness, wherein the first area is different from the second area and the first area has the same dimensions as the second area.

The foregoing and/or other aspects of the present general inventive concept may also be achieved by providing a backlight unit including a base plate, a plurality of first light-emitting device units disposed in a first area of the base plate, and a plurality of second light-emitting device units disposed in a second area of the base plate, wherein the number of the first light-emitting units is the same as the number of the second light-emitting units and the first area has a different size than the second area.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
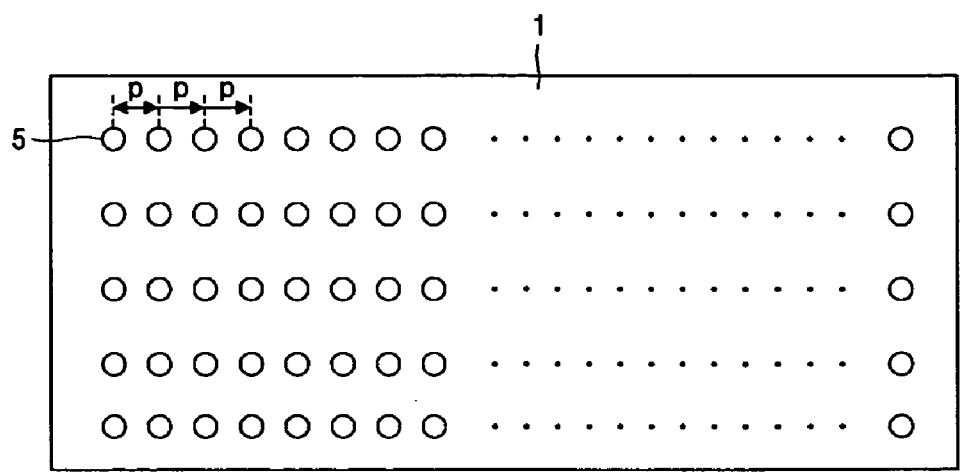
FIG. 1 is a view illustrating a typical arrangement of light-emitting diodes (LEDs) for a conventional direct light type backlight unit using LEDs as point light sources.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
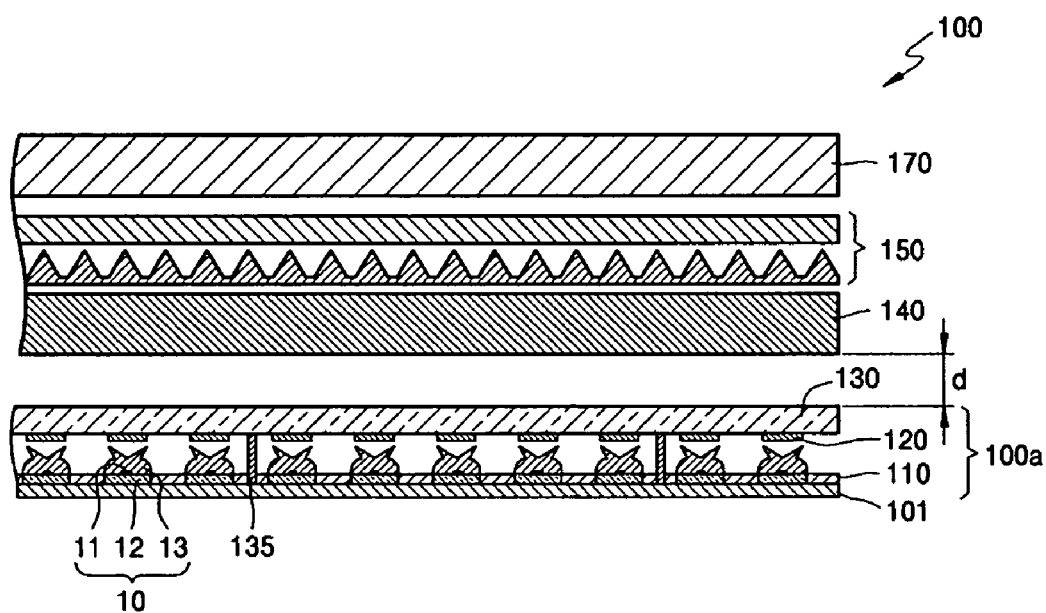
FIG. 2 is a cross-sectional view illustrating a backlight unit according to an embodiment of the present general inventive concept.

FIG. 2 illustrates a backlight unit 100 according to an embodiment of the present general inventive concept. Referring to FIG. 2, the backlight unit 100 includes a plurality of light-emitting device units 10 arranged on a base plate 101, a transmissive diffusion plate 140 that is disposed above the plurality of light-emitting device units 10 and transmits and diffuses incident light, and a reflective diffusion plate 110 that is disposed below the plurality of light-emitting device units 10 and reflects and diffuses incident light.

Here, 'above' refers to a principal propagation direction of light emitted from a light-emitting diode (LED) chip 11 in each of the light-emitting device units 10, while 'below' refers to a reverse direction. The principal propagation direction of the light substantially corresponds to a central axis C (see FIG. 6) of each of the light-emitting device units 10.

The base plate 101 serves as a substrate on which the plurality of light-emitting device units 10 are arranged. The base plate 101 may be a printed circuit board (PCB) to which the light-emitting diode (LED) chips 11 are electrically coupled. Alternatively, the backlight unit 100 may include the base plate 101 and a PCB to drive the light-emitting device units 10 separately. Intervals between the plurality of light-emitting device units 10 vary such that the light-emitting device units 10 are more densely arranged at edges of the base plate 101 than at a center of the base plate 101.

Figure 3:
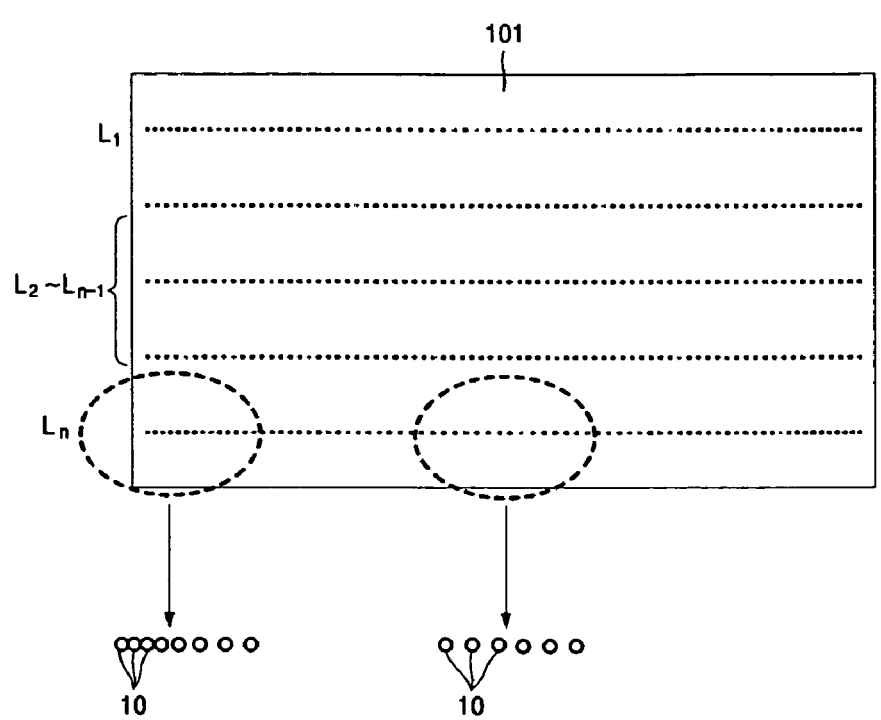
FIG. 3 is a plan view schematically illustrating an arrangement of light-emitting device units of the backlight unit of FIG. 2 according to an embodiment of the present general inventive concept.

FIG. 3 schematically illustrates an arrangement of the light-emitting device units 10 of FIG. 2 according to an embodiment of the present general inventive concept. Referring to FIG. 3, the light-emitting device units 10 are arranged on the base plate 101 in an array of n lines $L_1$ through $L_n$. Intervals between adjacent lines can be wider than the intervals between the light-emitting device units 10 on each line.

As illustrated in FIG. 3, the light-emitting device units 10 are more densely arranged at edges of at least outermost lines $L_1$ and $L_n$ than a center of the outermost lines $L_1$ and $L_n$. That is, the light-emitting device units 10 at the outermost lines $L_1$ and $L_n$ are arranged at intervals that increase from the edges to the center. On the other hand, the light-emitting device units 10 at each of the remaining lines $L_2$ through $L_{n-1}$ are arranged at equal intervals. Accordingly, the intervals between the light-emitting device units 10 arranged at the edges of the outermost lines $L_1$ and $L_n$ are narrower than the intervals between the light-emitting device units 10 arranged at each of the remaining lines $L_2$ through $L_{n-1}$.

The same number of light-emitting device units 10 may be arranged for each line. Accordingly, the intervals between the light-emitting devices 10 arranged at the center of the outermost lines $L_1$ and $L_n$ are wider than the intervals between the light-emitting devices 10 arranged at equal intervals in each of the remaining lines $L_2$ through $L_{n-1}$.

For example, when the interval between the adjacent light-emitting device units 10 arranged in each of the remaining lines $L_2$ through $L_{n-1}$ is d0, a minimum interval between the adjacent light-emitting device units 10 arranged at the edges of the outermost lines $L_1$ and $L_n$ is d1, and a maximum interval between the adjacent light-emitting device units 10 arranged at the center thereof is d2, the plurality of light-emitting device units 10 may be arranged to satisfy d1<d0<d2.

By varying only the interval between the light-emitting device units 10 arranged at the outermost lines $L_1$ and $L_n$ while maintaining the same number of light-emitting device units 10 arranged on each of the lines $L_1$ through $L_n$, it is possible to use the same number of light-emitting device units 10 as used when the light-emitting devices 10 on each line are arranged at equal intervals. This prevents creation of dark portions at four corners of the backlight unit 100 without incurring additional manufacturing costs, thereby resulting in improvement of an overall brightness uniformity.

FIG. 3 illustrates an example in which the light-emitting device units 10 are arranged in five lines, of which the light-emitting device units 10 are more densely arranged at the edges of the first and fifth lines $L_1$ and $L_5$ than at the center thereof while the light-emitting device units 10 in each of the three intermediate lines $L_2$ through $L_4$ are arranged at equal intervals. The number of lines and the number of light-emitting device units 10 arranged on each line may vary depending on design conditions.

When the light-emitting devices 10 is arranged as illustrated in FIG. 3, an amount of light on the four corners of the backlight unit 100 can be increased as compared to the light-emitting device being arranged at equal intervals, thereby improving the overall brightness uniformity with the same number of light-emitting device units 10 while preventing the four corners of the backlight unit 100 from appearing dark due to a shortage in the amount of light.

The brightness uniformity of the backlight unit 100 is critical to assess performance of a surface light source. Since brightness measured on the four corners of the backlight unit 100 is the lowest, the uniformity of the backlight unit 100 typically tends to decrease. However, the arrangement of the light-emitting device units 10 according to the embodiment of FIG. 3 in which the intervals between the light-emitting device units 10 on the four corners are narrow improves the brightness uniformity while preventing the creation of dark portions on the four corners.

Figure 4:
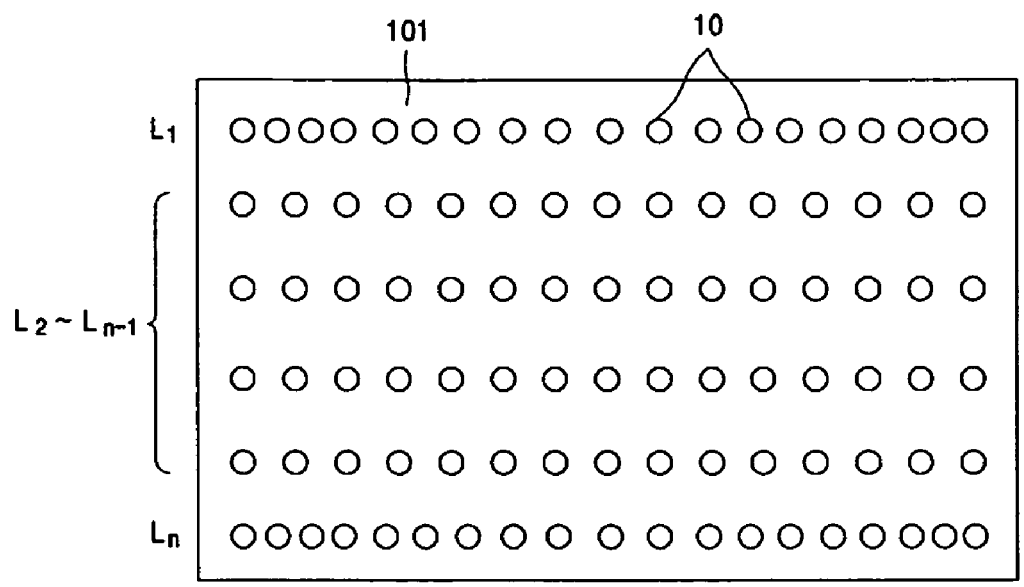
FIG. 4 is a plan view schematically illustrating an arrangement of the light-emitting device units of the backlight unit of FIG. 2 according to another embodiment of the present general inventive concept.
Figure 5:
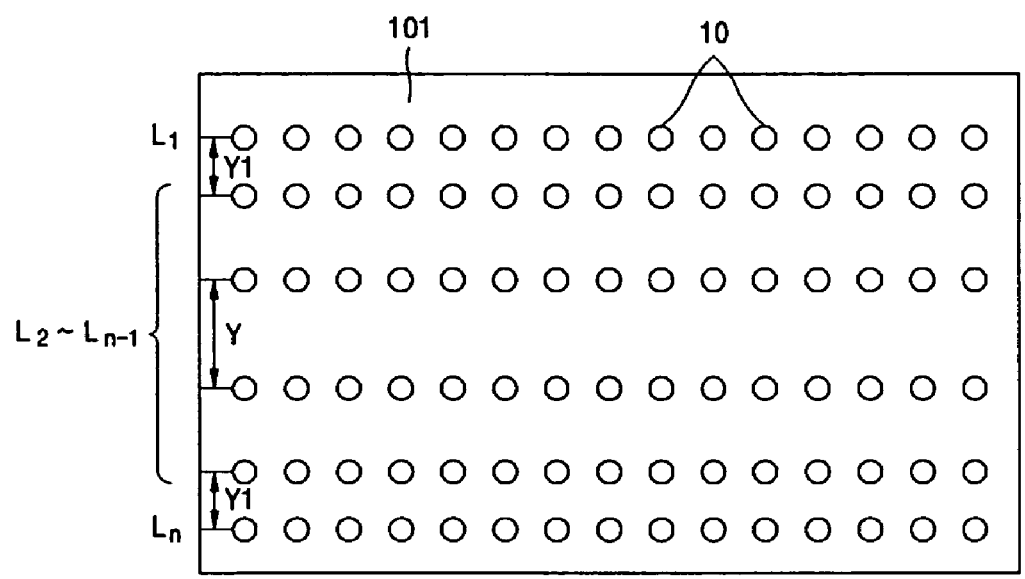
FIG. 5 is a plan view schematically illustrating an arrangement of the light-emitting device units of the backlight unit of FIG. 2 according to another embodiment of the present general inventive concept.

The plurality of light-emitting device units 10 are not limited to the arrangement of the embodiment of FIG. 3, and may be arranged in various ways. FIGS. 4 and 5 schematically illustrate arrangements of the light-emitting device units 10 of FIG. 2 according to various other embodiments of the present general inventive concept. While FIGS. 4 and 5 illustrate that the overall number of light-emitting device units 10 is reduced compared with that shown in FIG. 3 for better visualization, the number of light-emitting device units 10 may be greater than that illustrated in FIGS. 4 and 5. Furthermore, while FIGS. 4 and 5 illustrate the light-emitting device units 10 are arranged in six lines, the number of lines may vary depending on design conditions.

Referring to FIG. 4, the plurality of light-emitting device units 10 are arranged in n lines, and a number of the light-emitting device units 10 arranged in at least one outermost line, for example, $L_1$ and $L_n$, may be greater than a number of the light emitting device units 10 arranged in each of remaining lines $L_2$ through $L_{n-1}$. Furthermore, the light-emitting device units 10 are more densely arranged at edges of the outermost lines $L_1$ and $L_n$ than at a center thereof.

Similar to the embodiment of FIG. 3, the light-emitting device units 10 at the outermost lines $L_1$ and $L_n$ may be arranged at intervals that increase from the edges to the center. The light-emitting device units 10 at each of the remaining lines $L_2$ through $L_{n-1}$ may be arranged at equal intervals. Since there may be a greater number of the light-emitting device units 10 arranged in the outermost lines $L_1$ and $L_n$, the light-emitting device units 10 arranged at the center of the outermost lines $L_1$ and $L_n$ may be arranged at the same equal intervals as the light emitting device units 10 at each of the remaining lines $L_2$ through $L_{n-1}$.

The arrangement of the plurality of light-emitting device units 10 illustrated in FIG. 4, in which the light-emitting device units 10 are arranged more densely at the edges of the backlight unit 100 than at the center thereof prevents creation of dark portions on corners of the backlight unit 100 due to a shortage of the amount of light and thereby improves the overall brightness uniformity of the backlight unit 100.

FIG. 5 schematically illustrates an arrangement of the light-emitting device units 10 of FIG. 2 according to another embodiment of the present general inventive concept. Referring to FIG. 5, the plurality of light-emitting device units 10 are arranged on the base plate 101 in n lines, and an interval Y1 between outer lines along an arrangement direction of the n lines is narrower than an interval Y between intermediate lines. The number of light-emitting device units 10 and intervals between adjacent light-emitting device units 10 on each line may be equal, as illustrated in FIG. 5, but the present general inventive concept is not limited thereto.

The arrangement illustrated in FIG. 5, in which the light-emitting device units 10 are arranged more densely in the outer lines than in the intermediate lines prevents creation of dark portions on corners of the backlight unit 100 due to a shortage of the amount of light and thereby improves the overall brightness uniformity of the backlight unit 100.

FIG. 5 illustrates an example in which the intervals between the lines vary and the light-emitting device units 10 on each line are arranged at equal intervals. However, the intervals between the light-emitting device units 10 in at least one outermost line may be made narrower at edges of the at least one outermost line than at a center thereof and the intervals between the lines vary.

When a direction that each line extends is a horizontal direction and the arrangement direction of the lines is a vertical direction, the overall brightness uniformity of the backlight 100 can be improved by changing the interval between the light-emitting device units 10 in the horizontal and/or vertical directions as illustrated in FIGS. 3 through 5, and in particular, by arranging the light-emitting device units 10 at the edges of the backlight unit 100 more densely than at the center thereof. Here, FIGS. 3 and 4 illustrate the arrangements that can improve the brightness and prevent creation of dark portions by reducing the intervals between the light-emitting device units 10 at the four corners of the backlight unit 100 and increasing the amount of light thereon. FIG. 5 illustrates the arrangement in which the intervals between the light-emitting device units 10 along the vertical direction vary while maintaining the same number of light-emitting device units 10 for each line.

Figure 6:
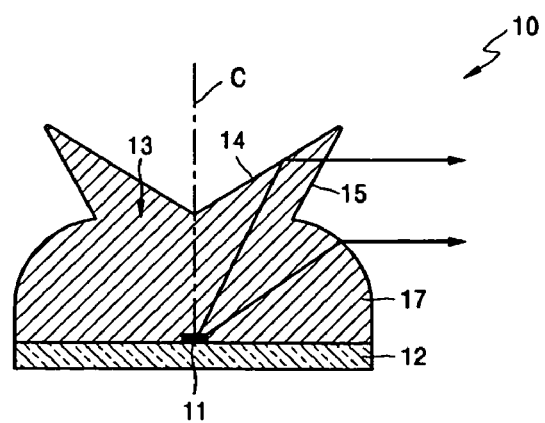
FIG. 6 is an enlarged cross-sectional view illustrating one of the light-emitting device units of the backlight unit of FIG. 2.

FIG. 6 is an enlarged cross-sectional view illustrating the light-emitting device unit 10. Referring to FIG. 6, the light-emitting device unit 10 can include the LED chip 11 to generate light and a side emitter 13 that serves as a collimator to collimate the light generated by the LED chip 11 and to emit the collimated light in a substantially lateral direction.

The LED chip 11 may be combined with the side emitter 13 when being mounted on a base 12. The LED chip 11 may adhere closely to the side emitter 13 in order to maximize an amount of light that is emitted by the LED chip 11 into the side emitter 13.

The light-emitting device units 10 may emit red (R), green (G), and blue (B) color beams. In this case, the light-emitting device units 10 include the LED chips 11 to generate R, G, and B color beams, respectively. In each of the lines $L_1$ through $L_n$, the light-emitting device units 10 that emit the R, G, and B color beams may be arranged alternately according to color.

The number of the light-emitting device units 10 for each color beam arranged on each line may vary depending on an intensity of the color beams emitted therefrom.

The intensities of R, G, and B color beams emitted from the corresponding LED chips 11 may be different from one another. For example, the intensity of the G color beam can be lower than that of the R and B color beams. Thus, for example, the number of red light-emitting device units 10 for each line may be equal to that of blue light-emitting device units 10, and the number of green light-emitting device units 10 may be double the number of red or blue light-emitting device units 10. The red, green, and blue light-emitting device units 10 may be arranged on each line in the order of R, G, G, B or B, G, G, R.

Alternatively, the light-emitting device units 10 may all emit white light. That is, each of the light-emitting device units 10 can include the LED chip 11 that generates white light.

When the backlight unit 100 includes the light-emitting device units 10 containing the LED chips 11 that generate the R, G, and B color beams or the light-emitting device units 10 with the LED chips 11 that generate the white light, a liquid crystal display (LCD) apparatus employing the backlight unit 100 can display a color image.

As illustrated in FIG. 6, the side emitter 13 can include a transparent body made of a transparent material. More specifically, the side emitter 13 can include a funnel-shaped reflecting surface 14 sloped with respect to the central axis C, a first refracting surface 15 obliquely angled with respect to the central axis C to refract light reflected from the reflecting surface 14, and a second refracting surface 17 extending as a convex curve from the base 12 to the first refracting surface 15. Light emitted from the LED chip 11 to the reflecting surface 14 of the side emitter 13 is reflected from the reflecting surface 14 to the first refracting surface 15 and then refracted from the first refracting surface 15 in an approximately lateral direction. Light emitted from the LED chip 11 directly to the second refracting surface 17 is refracted from the second refracting surface 17 in the approximately lateral direction.

Here, the side emitter 13 may have any other shape that can emit the light incident from the LED chip 11 in the approximately lateral direction.

Referring back to FIG. 2, the reflective diffusion plate 110 reflects and diffuses incident light so that the reflected light is propagated upward. The reflective diffusion plate 110 is disposed on the base plate 101 below the light-emitting device units 10. Accordingly, the reflective diffusion plate 110 can have a plurality of holes through which the corresponding light-emitting device units 10 can pass. The reflective diffusion plate 110 is disposed on the base plate 101 with the light-emitting device units 10 being inserted into the plurality of holes.

The transmissive diffusion plate 140 is spaced upward apart from a lower portion 100a of the backlight unit 100, i.e., the side-emitting light-emitting devices 10 and the reflective diffusion plate 110, by a predetermined distance d. The transmissive diffusion plate 140 transmits and diffuses incident light.

If the transmission diffusion plate 140 is disposed too close to the light-emitting device units 10, a region where the light-emitting device unit 10 is located appears brighter than a remaining region, resulting in degradation of the brightness uniformity. Furthermore, as a distance between the transmissive diffusion plate 140 and the light-emitting device unit 10 increases, a thickness of the backlight unit 100 increases. Thus, the distance d between the transmissive diffusion plate 140 and the lower portion 100a of the backlight unit 100 including the light-emitting device unit 10 and the reflective diffusion plate 110 may be determined to be minimized within a range in which light can be mixed as sufficiently as desired.

While most of the light generated by the LED chip 11 in each light-emitting device unit 10 is emitted by the side emitter 13 in the approximately lateral direction, some of the light (e.g., approximately 20%) may directly propagate upward from the side emitter 13.

Due to the presence of the light traveling upward the side emitter 13, light spots located at positions of the LED chips 11 may be visible from above the backlight unit 100. Furthermore, when the LED chips 11 that emit the R, G, and B color beams are used to display a color image, the colors of the LED chips 11 can be seen from above the backlight unit 100.

Thus, the backlight unit 100 may further include a plurality of reflecting mirrors 120 that are disposed on a surface of an optical plate 130 and reflect light emitted directly upward from the light-emitting device units 10. The plurality of reflecting mirrors 120 are arranged on the surface of the optical plate 130 to correspond to positions of the light emitting device units 10. That is, each of the plurality of reflecting mirrors 120 is disposed above a corresponding one of the light-emitting device units 10.

The optical plate 130 on which the plurality of reflecting mirrors 120 are arranged can be made of transparent polymethyl methacrylate (PMMA) transmitting incident light. Alternatively, the optical plate 130 may be a second transmissive diffusion plate.

Each of the plurality of reflecting mirrors 120 may be spaced apart from the corresponding light-emitting device units 10 by a predetermined distance. To maintain the distance, the optical plate 130 can be supported by a support 135. The support 135 supports the optical plate 130 relative to the reflective diffusion plate 110 or the base plate 101.

Using the second transmissive diffusion plate as the optical plate 130 allows the light to spread out sufficiently compared to using only the reflective diffusion plate 110 and the transmissive diffusion plate 140, thereby reducing the distance between the transmissive plate 140 and the light-emitting device unit 10, i.e., the distance d between the transmissive diffusion plate 140 and the lower portion 100a of the backlight unit 100. This results in a reduction in the thickness of the backlight unit 100.

When the second transmissive diffusion plate is used as the optical plate 130, transmittance of light is lower than when the transparent PMMA is used. Thus, either the transmissive diffusion plate or the transparent PMMA may be used as the optical plate 130 depending on whether reducing the thickness of the backlight unit 100 is more important than increasing a light emission rate.

Meanwhile, the backlight unit 100 further includes a brightness enhancement film (BEF) 150 to improve a directionality of light that is transmitted through the transmissive diffusion plate 140 and a polarization enhancement film 170 to increase polarization efficiency.

The BEF 150 is used to refract and focus the light that is transmitted through the transmissive diffusion plate 140 to enhance the directionality of the light, thereby increasing the brightness of the light. The polarization enhancement film 170 transmits one type of polarized light beam, e.g., a p-polarized light beam, while reflecting another type of polarized light beam, e.g., an s-polarized light beam, thus allowing most incident light beams to be converted into p-polarized beams as the incident light beams are transmitted through the polarization enhancement film 170.

An LCD apparatus that employs the backlight unit 100 includes a liquid crystal panel disposed above the backlight unit 100. As is well known in the art, as one linearly polarized beam passes through a liquid crystal layer in the liquid crystal panel, a direction of a liquid crystal director is changed by an applied electric field so that the polarization of the beam is changed, thereby enabling image information to be displayed on the liquid crystal panel.

Since an efficiency of light utilization is improved when light incident on the liquid crystal panel has single polarization state, using the polarization enhancement film 170 in the backlight unit 100 can increase optical efficiency.

As described above, using the backlight unit 100 for the LCD apparatus prevents the four corners of the backlight unit 100 from appearing dark and thereby improves the brightness uniformity, thereby providing a high quality image with uniform brightness across an entire screen of the LCD apparatus.

Figure 7:
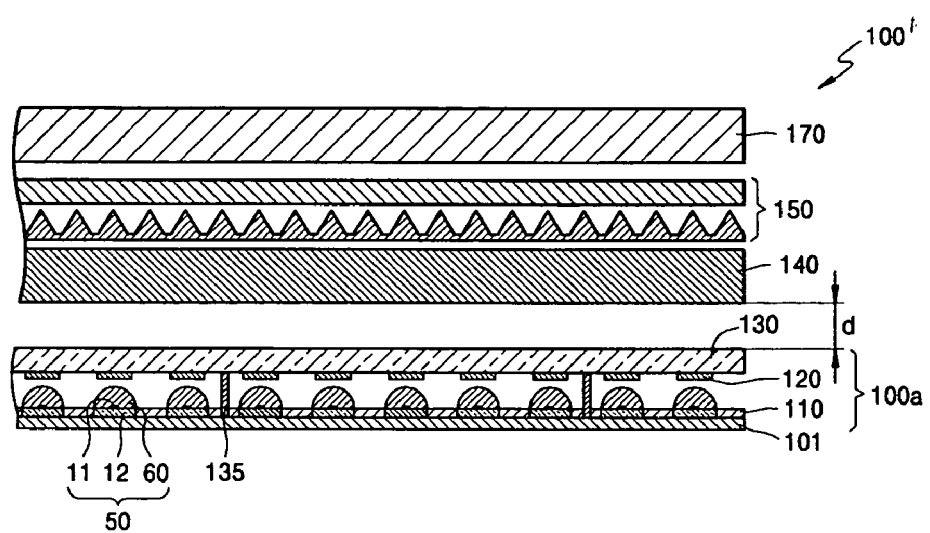
FIG. 7 is a cross-sectional view illustrating a backlight unit according to another embodiment of the present general inventive concept.

FIG. 7 is a cross-sectional view illustrating a backlight unit 100' according to a second embodiment of the present general inventive concept. While the backlight unit 100 of FIG. 2 includes the light-emitting device units 10, each having the side emitter 13 as a collimator, the backlight unit 100' of FIG. 7 includes light-emitting device units 50, each having a dome-shaped collimator 60 The remaining components in the backlight unit 100 of FIG. 7 have substantially the same functions as their counterparts illustrates in FIG. 2, except for the light-emitting device unit 50 with the dome-shaped collimator 60. Like reference numerals in the drawings denote like elements, and thus their descriptions will be omitted.

Figure 8A:
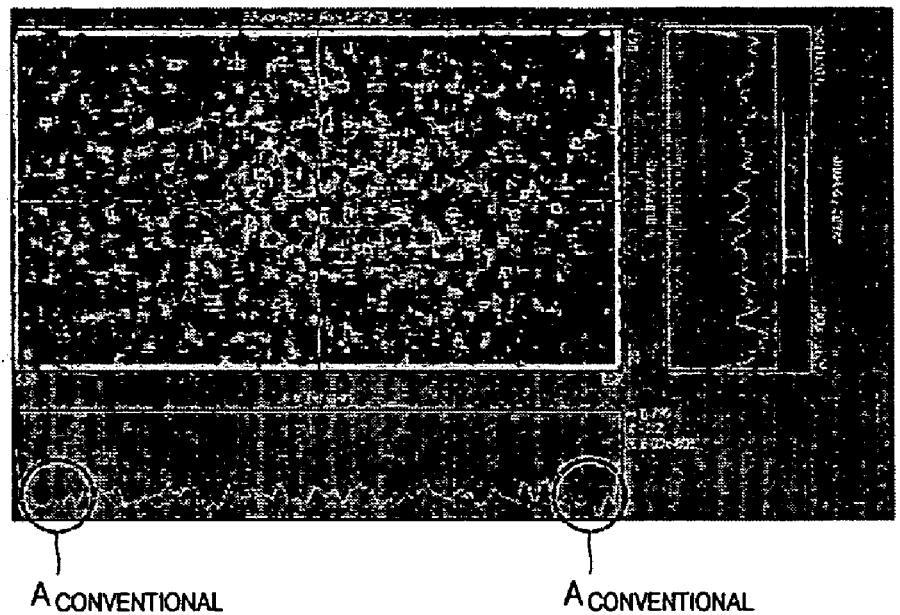
FIG. 8A is a view illustrating a simulation result of uniformity when light-emitting device units are arranged in a conventional arrangement.

The effect of improvement of dark portions when the light-emitting device units 10(50) are more densely arranged at edges of outermost lines than at a center thereof as described above in the backlight unit 100 will now be described in detail with reference to FIGS. 8A and 8B. FIG. 8A illustrates a result of an optical simulation when the light-emitting device units 10 (50) are arranged in a conventional arrangement, and FIG. 8B illustrates a result of an optical simulation when light-emitting device units 10 (50) are arranged according to an embodiment of the present general inventive concept.

Figure 8B:
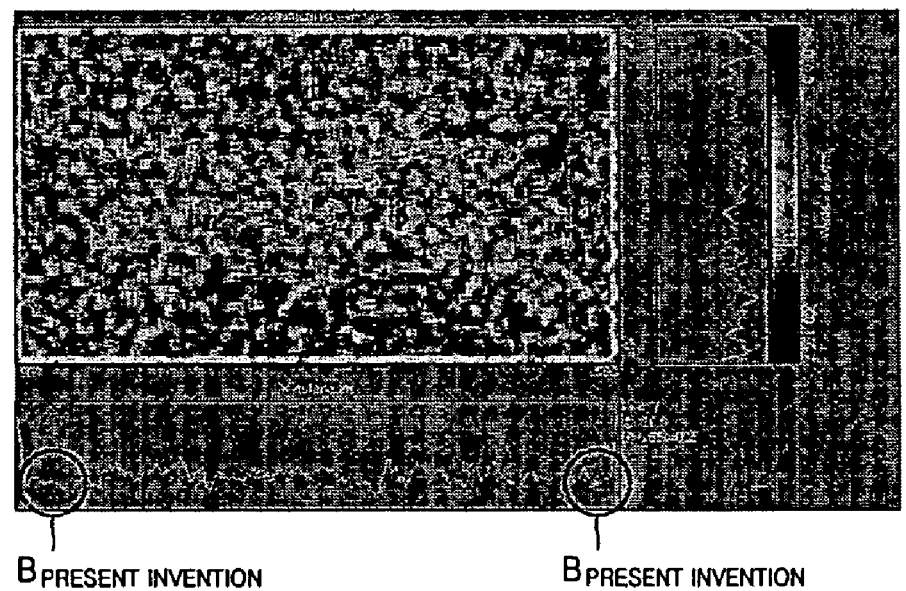
FIG. 8B is a view illustrating a simulation result of uniformity when light-emitting device units are arranged according to an embodiment of the present general inventive concept.
Figure 9:
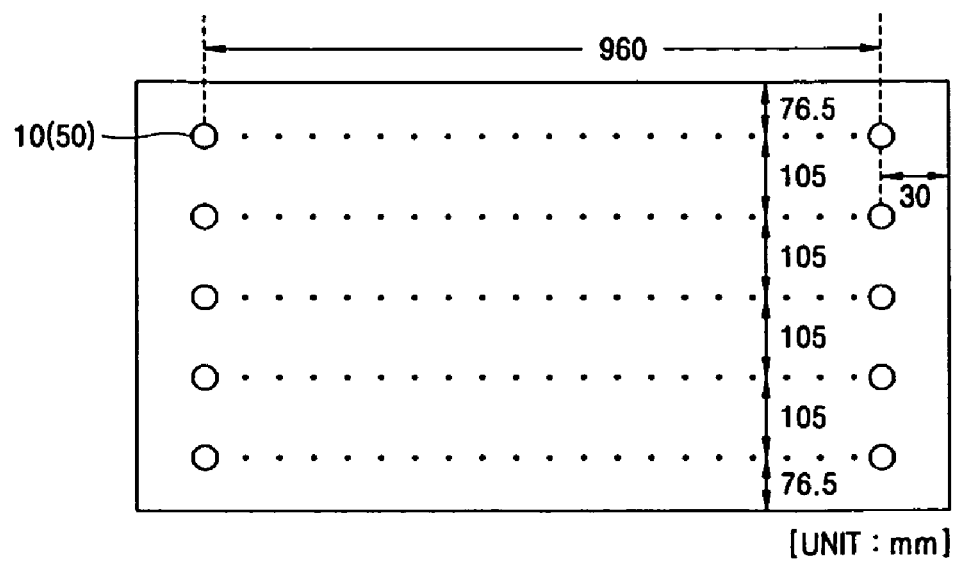
FIG. 9 is a view schematically illustrating intervals at which the light-emitting device units are arranged to obtain the results illustrated in FIGS. 8A and 8B.

The results illustrated in FIGS. 8A and 8B are obtained when the light-emitting device units 10 (50) are arranged in five lines, 19 red, 38 green, and blue light-emitting device units are arranged in order of R, G, G, B or B, G, G, R for each line, a total of 76 light-emitting device units 10 (50) are arranged within a width of 960 mm, and an interval between lines is 105 mm, as illustrated in FIG. 9.

FIG. 8A corresponds to a case in which the light-emitting device units 10 (50) on each line are arranged at equal intervals, and FIG. 8B corresponds to a case in which the light-emitting device units 10 (50) are more densely arranged at the edges of first and fifth lines than at the center thereof and arranged at equal intervals in the second through fourth lines.

As evident from portions indicated by $A_{conventional}$ in FIG. 8A and $B_{present\ invention}$ in FIG. 8B, the four corners of a backlight unit 100 appear brighter when the light-emitting device units 10 (50) are more densely arranged at the edges of the outermost lines than at the center thereof than when light-emitting device units 10 (50) on each line are arranged at equal intervals.

As a result of calculating the effect of improvements in uniformity and removal of dark portions using the optical simulation results, this embodiment of the present general inventive concept exhibits enhancement of about 3% in uniformity and about 19% in removal of dark portions over the conventional method which exhibits uniformity of 86% and dark portion removal of 76%. That is, this embodiment of the present general inventive concept exhibits uniformity of about 89% and removal of dark portions of about 95%.

Figure 10:
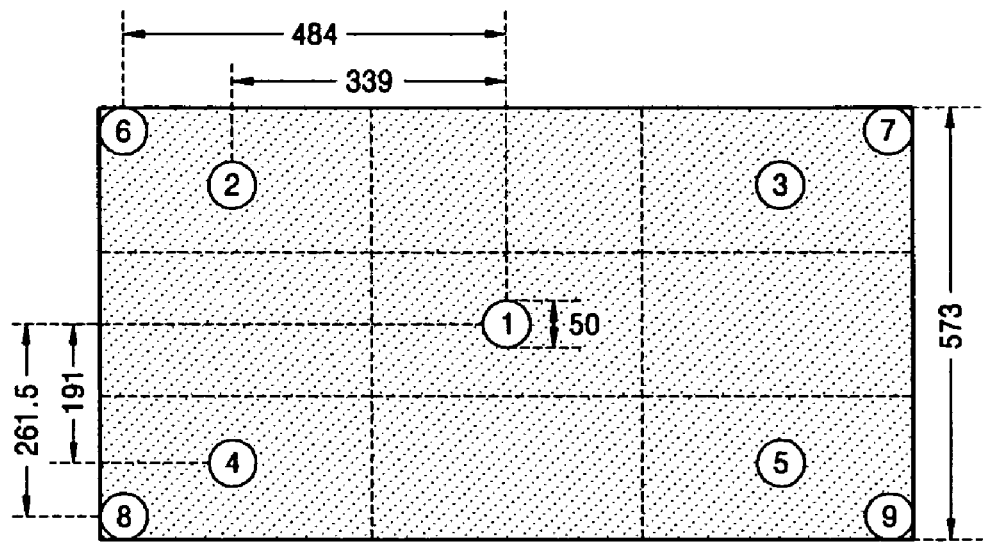
FIG. 10 is a view schematically illustrating measurement ranges and points used in assessing uniformity and calculating an effect of improvement of dark portions.

The resultant improvements in the uniformity and the removal of dark portions are measured using measurement ranges and points illustrated in FIG. 10. As illustrated in FIG. 10, the measurement points include a central point ①, four points ②, ③, ④, and ⑤ located 339 mm in width and 191 mm in length away from the central point ①, and four corner points ⑥, ⑦, ⑧, and ⑨ located 484 mm in width and 261.5 mm in length away from the central point ①. The width of each point measured is 50 mm.

When T1, T2, T3, T4, T5, T6, T7, T8, and T9 denote brightnesses measured at points ①, ②, ③, ④, ⑤, ⑥, ⑦, ⑧, and ⑨, respectively, the uniformity is represented as a percentage of a minimum of T2, T3, T4 and T5 divided by T1 and the removal of dark portions is expressed as a percentage of a minimum of T6, T7, T8, and T9 divided by T1.

The uniformity is typically measured at points located a distance corresponding to about 10% inward from the edges. Points specified in the American National Standards Institute (ANSI), which is an international standard used in estimating uniformity, correspond to the centers of nine equally sized rectangles that comprise the whole image, i.e., the points ②, ③, ④, and ⑤.

The result of calculating improvements in the uniformity and the removal of dark portions using the optical simulation results demonstrates that arranging the light-emitting device units according to this embodiment of the present general inventive concept can improve uniformity while significantly preventing creation of dark portions without compromising the uniformity.

Figure 11:
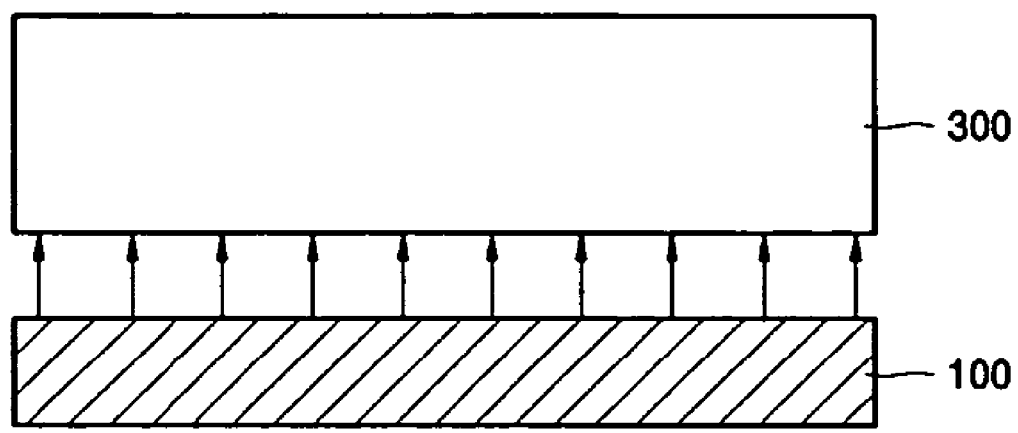
FIG. 11 is a view schematically illustrating a liquid crystal display (LCD) apparatus employing a backlight unit according to an embodiment of the present general inventive concept.
Figure 12:
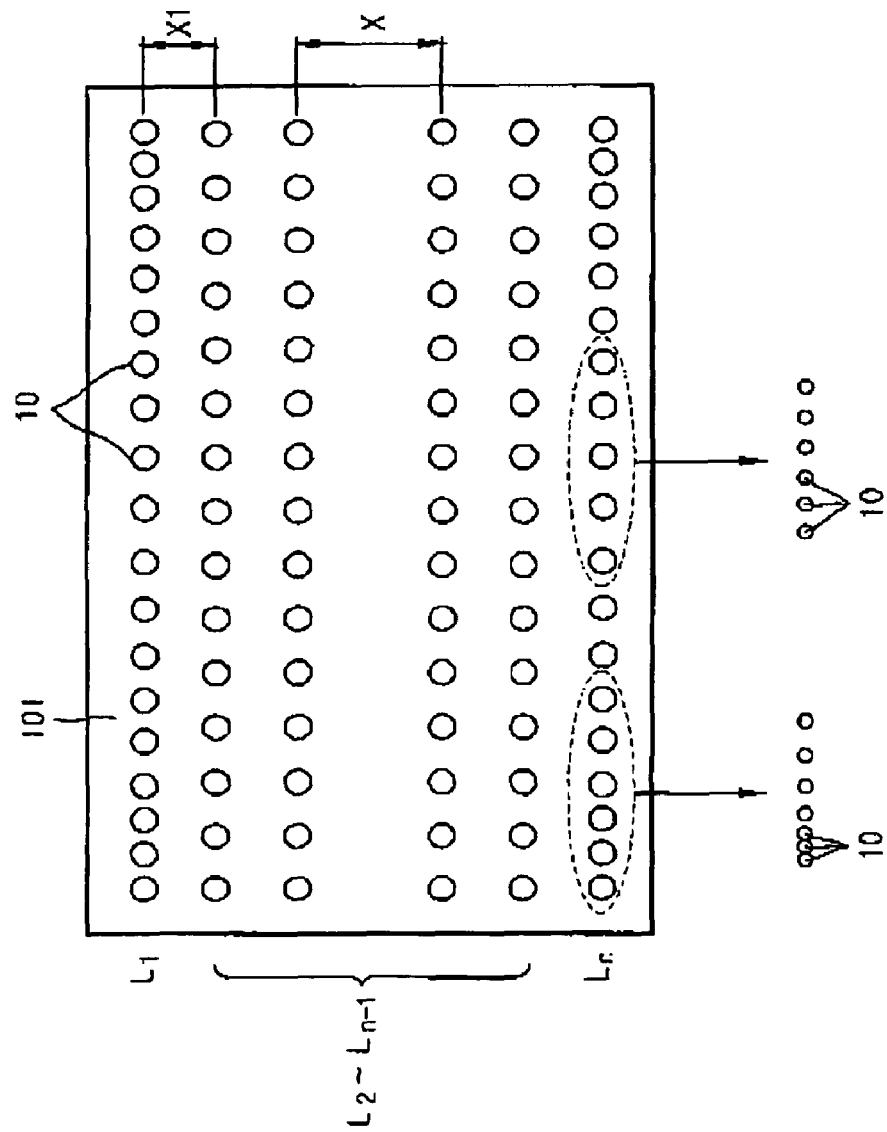

FIG. 11 schematically illustrates an LCD apparatus employing the backlight unit 100 according to an embodiment of the present general inventive concept. Referring to FIG. 11, the LCD apparatus includes the backlight unit 100 and a liquid crystal panel 300 disposed above the backlight unit 100. The liquid crystal panel 300 is coupled to driving circuitry. Since the detailed configuration of the liquid crystal panel 300 and display operation using the driving circuitry are widely known in the art, their description will not be given.

In a backlight unit according to embodiments of the present general inventive concept, a plurality of light-emitting device units are more densely arranged at the edges of a base plate than at a center thereof by varying intervals between the plurality of light-emitting device units, thereby preventing creation of dark portions at corners of the base plate due to a shortage in an amount of light while improving the overall brightness uniformity.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit comprising:
   a base plate; and
   a plurality of light-emitting device units arranged in a two-dimensional array having a first and second direction on the base plate with varying arrangement intervals along the first direction such that the light-emitting device units are more densely arranged at edges of the base plate along the first direction than light-emitting device units at a center of the base plate along the second direction,
   wherein the plurality of light-emitting device units are arranged on the base plate in a plurality of lines,
   wherein the number of the light-emitting device units arranged in at least one outermost line is greater than the number of the light-emitting device units arranged in each of the remaining lines, and
   wherein the plurality of light-emitting device units are more densely arranged in at least one outermost line of the array than at a center of the outermost line of the array.

2. The backlight unit of claim 1, wherein the arrangement intervals between the light-emitting device units arranged in the at least one outermost line increase from ends of the at least one outermost line to the center thereof.

3. The backlight unit of claim 1, wherein the light-emitting device units in each of remaining lines other than the outermost lines are arranged at equal arrangement intervals.

4. The backlight unit of claim 3, wherein when an interval between the light-emitting device units arranged in each of the remaining lines is d0, a minimum interval between the light-emitting device units arranged at the ends of the at least one outermost line is d1, and a maximum interval between the light-emitting device units arranged at the center of the at least one outermost line is d2, the light-emitting device units are arranged to satisfy d1 <d0 <d2.

5. The backlight unit of claim 1, wherein the light-emitting device units in each of the remaining lines are arranged at equal arrangement intervals.

6. The backlight unit of claim 1, wherein the arrangement intervals between the light-emitting device units arranged in the at least one outermost line increase from the ends of the at least one outermost line to the center thereof.

7. The backlight unit of claim 1, wherein the plurality of light-emitting device units are arranged on the base plate in a plurality of lines arranged in rows, and wherein the arrangement intervals between outer rows is narrower than the arrangement intervals between intermediate rows.

8. The backlight unit of claim 1, wherein each of the plurality of light-emitting device units comprises:
   a light-emitting diode (LED) chip to generate light; and
   a collimator to collimate the light generated by the LED chip.

9. The backlight unit of 8, wherein the collimator comprises a side emitter to direct the generated light in an approximately lateral direction.

10. The backlight unit of claim 8, wherein the collimator is dome-shaped.

11. The backlight unit of claim 1, further comprising:
    an optical plate; and
    a plurality of reflecting mirrors that are disposed on a surface of the optical plate and reflect light emitted directly upward from the light-emitting device units.

12. The backlight unit of claim 11, wherein the optical plate comprises one of a transparent polymethyl methacrylate (PMMA) plate and a transmissive diffusion plate.

13. The backlight unit of claim 1, wherein the light-emitting device units emit red, green, and blue color beams are alternately arranged according to color on the base plate.

14. The backlight unit of claim 1, further comprising:
    a first transmissive diffusion plate that is disposed above the light-emitting device units and transmits and diffuses incident light.

15. The backlight unit of claim 14, further comprising:
    a reflective diffusion plate that is disposed below the light-emitting device units and reflects and diffuses incident light.

16. The backlight unit of claim 14, further comprising:
    at least one of a brightness enhancement film (BEF) to improve a directionality of the light transmitted through the first transmissive diffusion plate and a polarization enhancement film to increase an efficiency of polarization.

17. A liquid crystal display apparatus comprising:
    a liquid crystal panel; and
    a backlight unit to emit light on the liquid crystal panel and having:
       a base plate, and
       a plurality of light-emitting device units arranged in a two-dimensional array having a first and second direction on the base plate with varying arrangement intervals along the first direction such that the light-emitting device units are more densely arranged at edges of the base plate along the first direction than light-emitting device units at a center of the base plate along the second direction,
    wherein the plurality of light-emitting device units are arranged on the base plate in a plurality of lines,
    wherein the number of the light-emitting device units arranged in at least one outermost line is greater than the number of the light-emitting device units arranged in each of the remaining lines, and wherein the plurality of light-emitting device units are more densely arranged in at least one outermost line of the array than at a center of the outermost line in the array.

18. The apparatus of claim 17, wherein the arrangement intervals between the light-emitting device units arranged in the at least one outermost line increase from ends of the at least one outermost line to the center thereof.

19. The backlight unit of claim 17, wherein the light-emitting device units in each of remaining lines other than the outermost lines are arranged at equal arrangement intervals.

20. The apparatus of claim 19, wherein when an interval between the light-emitting device units arranged in each of the remaining lines is d0, a minimum interval between the light-emitting device units arranged at the ends of the at least one outermost line is d1, and a maximum interval between the light-emitting device units arranged at the center of the at least one outermost line is d2, the light-emitting device units are arranged to satisfy d1 <d0 <d2.

21. The apparatus of claim 17, wherein the light-emitting device units in each of the remaining lines are arranged at equal arrangement intervals.

22. The apparatus of claim 17, wherein the arrangement intervals between the light-emitting device units arranged in the at least one outermost line increase from the ends of the at least one outermost line to the center thereof.

23. The apparatus of claim 17, wherein the plurality of light-emitting device units arranged on the base plate in the plurality of lines form rows of the array, and wherein the arrangement intervals between outer rows of the array are narrower than the arrangement intervals between intermediate rows.

24. The apparatus of claim 17, wherein each of the plurality of light-emitting device units comprises:
a light-emitting diode (LED) chip to generate light; and
a collimator to collimate the light generated by the LED chip.

25. The apparatus of 24, wherein the collimator comprises a side emitter to direct the generated light in an approximately lateral direction.

26. The apparatus of claim 24, wherein the collimator is dome-shaped.

27. The apparatus of claim 17, further comprising:
an optical plate; and
a plurality of reflecting mirrors that are disposed on a surface of the optical plate and reflect light emitted directly upward from the light-emitting device units.

28. The apparatus of claim 27, wherein the optical plate comprises one of transparent polymethyl methacrylate (PMMA) plate and a transmissive diffusion plate.

29. The apparatus of claim 17, wherein the light-emitting device units emitting red, green, and blue color beams are alternately arranged according to color on the base plate.

30. The apparatus of claim 17, further comprising:
a first transmissive diffusion plate that is disposed above the light-emitting device units and transmits and diffuses incident light.

31. The apparatus of claim 30, further comprising:
a reflective diffusion plate that is disposed below the light-emitting device units and reflects and diffuses incident light.

32. The apparatus of claim 30, further comprising:
at least one of a brightness enhancement film (BEF) to improve a directionality of the light transmitted through the first transmissive diffusion plate and a polarization enhancement film to increase an efficiency of polarization.

33. A backlight unit usable with a liquid crystal display (LCD) apparatus, comprising:
a base plate; and
a plurality of rows of light emitting units disposed along a first direction on the base plate to emit light, the plurality of rows including:
outer rows disposed at opposite edges of the base plate and having light emitting units spaced apart along the first direction by smaller intervals at ends thereof than light-emitting device units at a center thereof, and
inner rows disposed between the outer rows on the base plate and having light emitting units spaced apart by equal intervals along the first direction,
wherein the outer rows have a greater number of light emitting units than the inner rows.

34. The backlight unit of claim 33, wherein the light emitting units disposed at the center of the outer rows are spaced apart by the same interval as the light emitting units of the inner rows.

35. The backlight unit of claim 33, wherein the plurality of rows are spaced apart by equal intervals from each other.

* * * * *